United States Patent [19]

Sano

[11] Patent Number: 5,895,899
[45] Date of Patent: Apr. 20, 1999

[54] COMBINATION SWITCH DEVICE

[75] Inventor: Yukiharu Sano, Shizuoka, Japan

[73] Assignee: Yazaki Corporation, Tokyo, Japan

[21] Appl. No.: 09/006,835

[22] Filed: Jan. 14, 1998

[30]  Foreign Application Priority Data

Jan. 17, 1997 [JP] Japan ................................. 9-006532

[51] Int. Cl.$^6$ ................................................... H01H 9/00
[52] U.S. Cl. ................................. 200/61.54; 200/61.27
[58] Field of Search ........................... 200/61.27, 61.54,
200/61.3–61.38; 307/10.1; 439/15

[56]  References Cited

U.S. PATENT DOCUMENTS

| 4,218,595 | 8/1980  | Honjo          | 200/61.54 |
| 4,404,438 | 9/1983  | Honjo          | 200/61.54 |
| 4,739,130 | 4/1988  | Roller et al.  | 200/61.27 |
| 4,888,456 | 12/1989 | Suzuki         | 200/61.27 |
| 5,385,067 | 1/1995  | Wiersing et al.| 74/484 R  |
| 5,396,106 | 3/1995  | Chretien et al.| 307/10.1  |

Primary Examiner—Michael A. Friedhofer
Attorney, Agent, or Firm—Sughrue, Mion, Zinn, Macpeak & Seas, PLLC

[57]  ABSTRACT

A combination switch device having a body incorporating bus bars therein. The body is provided with a turn lever switch and a wiper lever switch that are releasably attached to the body and electrically contact the body. A control unit that controls operations of the respective lever switches is connected to the bus bars while incorporated in the wiper lever switch.

3 Claims, 9 Drawing Sheets

COMBINATION SWITCH DEVICE

BACKGROUND OF THE INVENTION

1. Field of the Invention

The invention relates to a combination switch device having lever switches releasably attached thereto.

2. Description of the Related Art

In order to reduce the weight of a motor vehicle, recently there has been a tendency toward applying electronic systems (multiplex communications and the like) to electrical instruments attached to the motor vehicle. As part of such development, the application of an electronic system to a combination switch device for controlling lamps, wipers, and the like, that is attached to the periphery of the steering wheel column, has been under study. As a conventional combination switch device of this type, one that is shown in FIG. 7 has been proposed.

FIG. 7 is a top view in section of such conventional combination switch device. This combination switch device 1 includes: a turn lever switch 3 for operating head lamps, turn signal lamps, and the like; a wiper lever switch 5 for operating wipers, washers, and the like; a body 7 that allows the steering shaft to be inserted thereinto; and a control unit 9 having a control circuit formed therein.

The turn lever switch 3 and the wiper lever switch 5 are substantially conical, and respectively include: operation levers 3a, 5a that can be turned when an operator moves the distal ends thereof; and lever switch portions 3b, 5b that switch connections based on the turning of the operation levers 3a, 5a. Further, these lever switches 3 and 5 respectively have knob switch portions 3c, 5c of a pushbutton type arranged inside the operation levers 3a, 5a. The turn lever switch 3 and the wiper lever switch 5 are separated (into units) for maintenance considerations, and are inserted so as to slide into switch assembly containing portions 11 and 13 of the body 7 from both right and left sides of the body 7, respectively, to be fixed to the body 7.

On the other hand, the control unit 9 is disposed in a control unit containing portion 1S within the body 7, the control unit containing portion 15 being closer to the engine side (the lower side as viewed in FIG. 7) than the turn lever switch 3 and the wiper lever switch 5.

With respect to electrical connection of the turn lever switch 3 and the wiper lever switch 5 to the control unit 9, bus bars 25 for transmitting signals and currents are incorporated in the body 7, and the control unit 9 is connected to the bus bars 25. Further, at the time of attaching the lever switches 3 and 5 to the body 7, assembling-side connection terminals 21 and 23 arranged on the lever switches 3 and 5 are connected to receiving-side connection terminals 17 and 19 arranged on the switch assembly containing portions 11 and 13 of the body 7 simultaneously, so that the lever switches 3 and 5 are electrically connected to the bus bars 25. Therefore, in this combination switch device 1, mechanical assembly of the lever switches 3 and 5 to the body 7 and electrical connection of the lever switches 3 and 5 to the control unit 9 can be implemented simultaneously. As a result, this conventional combination switch device has been successful not only in improving assembling performance but also in downsizing wiring boards and curtailing the number of parts compared with other conventional combination switch devices prior to this device.

As shown in FIG. 7, in the case where the knob switch portions 3c and 5c and the lever switch mechanisms (lever switch portions 3b and 5b) have been electrically connected in advance to the assembling-side connection terminals 21 and 23 in particular, the lever switches 3 and 5 can be electrically connected completely whenever the lever switches 3 and 5 are attached to the body 7. As a result, assembling performance can be further improved.

However, in the aforementioned conventional combination switch device 1, the lever switches 3 and 5 are separated from the control unit 9 that is in the body 7. Therefore, the number of bus bars within the body for connecting the lever switches 3 and 5 to the control unit 9 is increased, and this has elevated the cost of manufacture. That is, as shown in FIG. 8, the bus bars 25 require bus bars 25a and bus bars 25b. The bus bars 25a are arranged so as to connect between the switch assembly containing portions 11 and 13 respectively formed on both right and left sides of the body 7. The bus bars 25b are arranged within the switch assembly containing portion 13 on one side.

These bus bars 25a and 25b will be described in more detail. If, as shown, e.g., in FIG. 7, the control unit 9 is arranged in the control unit containing portion 15 formed on the side (on the left side as viewed in FIG. 7) to which the wiper lever switch 5 is connected, and if the turn lever switch 3 and the wiper lever switch 5 respectively have the functions such as shown in FIG. 9, then the bus bars 25a connect leads wired to a contact board 3a of the turn lever switch 3 to the control unit 9 via the assembling-side connection terminals 21 and the receiving-side connection terminals 17 as shown in FIG. 9. On the other hand, the bus bars 25b connect leads wired to a contact board 5a of the wiper lever switch 5 to the control unit 9 via the assembling-side connection terminals 23 and the receiving-side connection terminals 19.

Further, in the construction of the aforementioned combination switch device 1, the body is so shaped as to correspond to the number of bus bars and therefore, any increase in the number of bus bars has increased the size of the body, which is another problem.

SUMMARY OF THE INVENTION

The invention has been made in view of the aforementioned circumstances. The object of the invention is, therefore, to provide a combination switch device in which the number of bus bars can be curtailed and in which a cost reduction can be implemented and, at the same time, the body can be downsized by eliminating a control board and a cover compared, e.g., with a conventional example in which the control unit is disposed on the board and the cover is put on the control unit.

To achieve the above object, the invention provides a combination switch device comprising: a body incorporating bus bars therein; a lever switch incorporating assembling-side connection terminals and having such a structure that the lever switch is releasably attached to the body and that the assembling-side connection terminals electrically contact the bus bars at the time of attaching the lever switch to the body; and a control unit incorporated in the lever switch and connected to the assembling-side connection terminals, the control unit getting connected to the bus bars at the time of attaching the lever switch to the body.

DETAILED DESCRIPTION OF THE PREFERRED EMBODIMENT

A combination switch device, which is a preferred embodiment of the invention, will now be described in detail with reference to the drawings.

Figure 1:
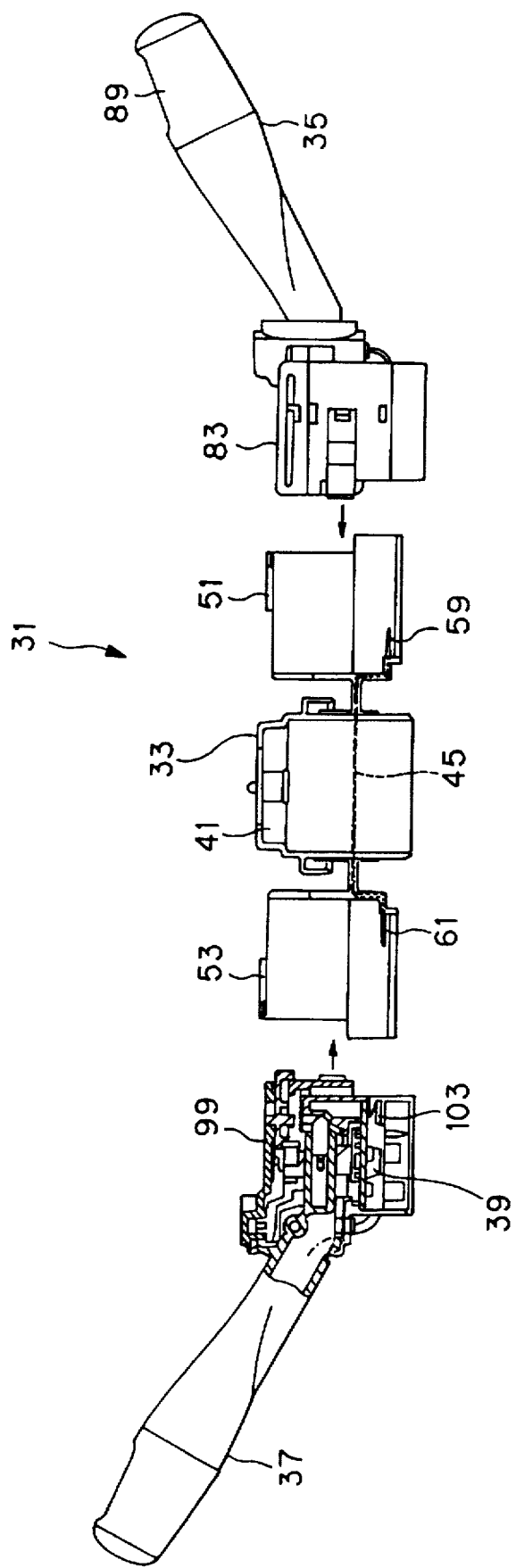
FIG. 1 is an exploded top view in section of a combination switch device, which is an embodiment of the invention.

As shown in FIG. 1, a combination switch device 31 according to this embodiment includes: a body 33 allowing a steering shaft to be inserted thereinto; a turn lever switch 35 and a wiper lever switch 37 that are to be assembled to the body 33, respectively; a control unit (ECU) 39 incorporated into the wiper lever switch 37; and a cancel cam 41 formed on the cabin side of the body 33. It may be noted that the cancel cam 41 automatically resets the turn lever switch 35 while interlocking with the steering.

In FIG. 1, the lower portion shows the engine room side and the upper portion the cabin side. Therefore, the appearance of the combination switch device 31 as viewed from the engine room side is as shown in FIG. 2.

Figure 2:
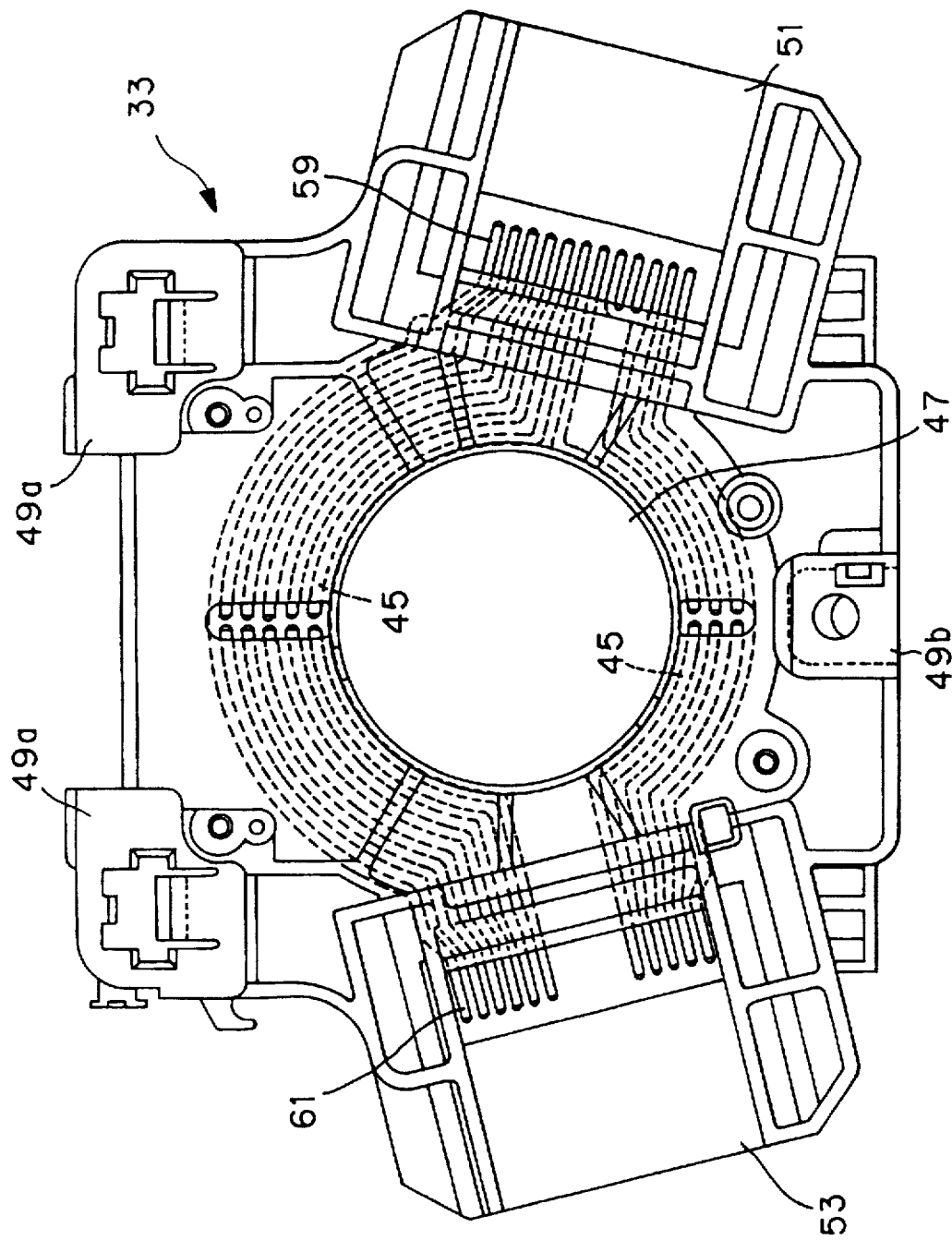
FIG. 2 is a front view of a body shown in FIG. 1.

As shown in FIG. 2, the body 33 has bus bars 45, a steering shaft inserting portion 47, upper and lower column unit mounting portions 49a and 49b, a right-side turn switch assembly containing portion 51, and a left-side wiper switch assembly containing portion 53. The bus bars 45 that transmit signals and currents are incorporated into the body 33 by insert-molding.

The bus bars 45 are bifurcated both rightward and leftward, forming first receiving-side connection terminals 59 that are introduced into the turn switch assembly containing portion 51 and second receiving-side connection terminals 61 that are introduced into the wiper switch assembly containing portion 53.

Figure 3:
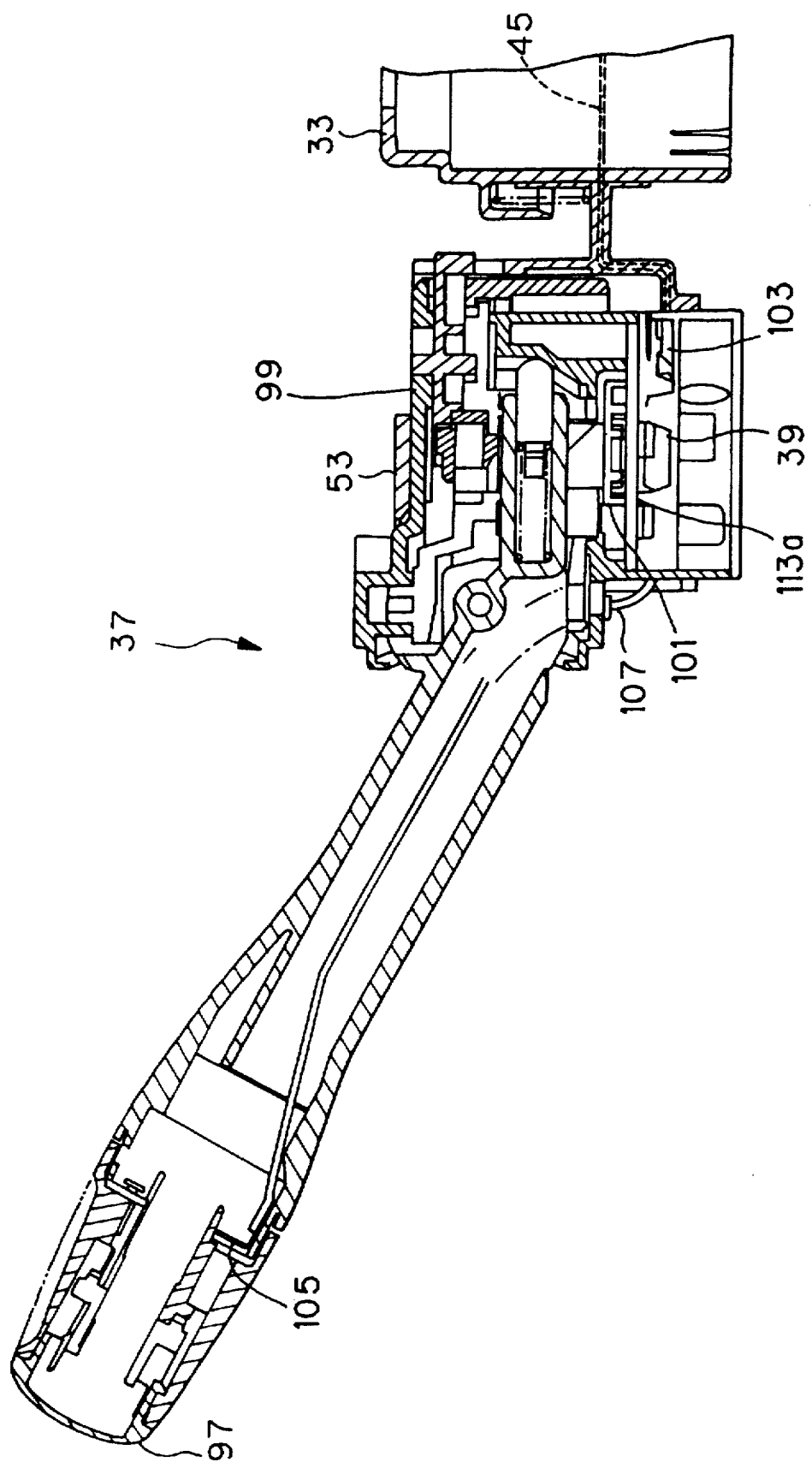
FIG. 3 is an enlarged top view in section with a wiper lever switch shown in FIG. 1 attached.

As shown in FIG. 1, the wiper lever switch 37 is separated from the body 33 (into a unit) for maintenance considerations. Further, as also shown in FIG. 3, the wiper lever switch 37 includes: a substantially conical operation lever 97; a wiper switch assembly 99; and the control unit 39. A wiper lever switch mechanism 101 is arranged within the wiper switch assembly 99. Further, the wiper lever switch mechanism 101 has second assembling-side connection terminals 103 that are to be connected to the second receiving-side connection terminals 61 (see FIGS. 1 and 2).

A portion close to the base end of the operation lever 97 is journaled within the wiper switch assembly 99. When an operator moves the operation lever 97 vertically or horizontally with this journal as a pivot, the base end of the operation lever 97 turns within the wiper switch assembly 99, and such turning motions act on the wiper lever switch mechanism 101 to thereby switch connections. The connection selected by the wiper lever switch mechanism 101 is transmitted to the bus bars 45 via the control unit 39 and the second assembling-side connection terminals 103, as will be described later.

Figure 4:
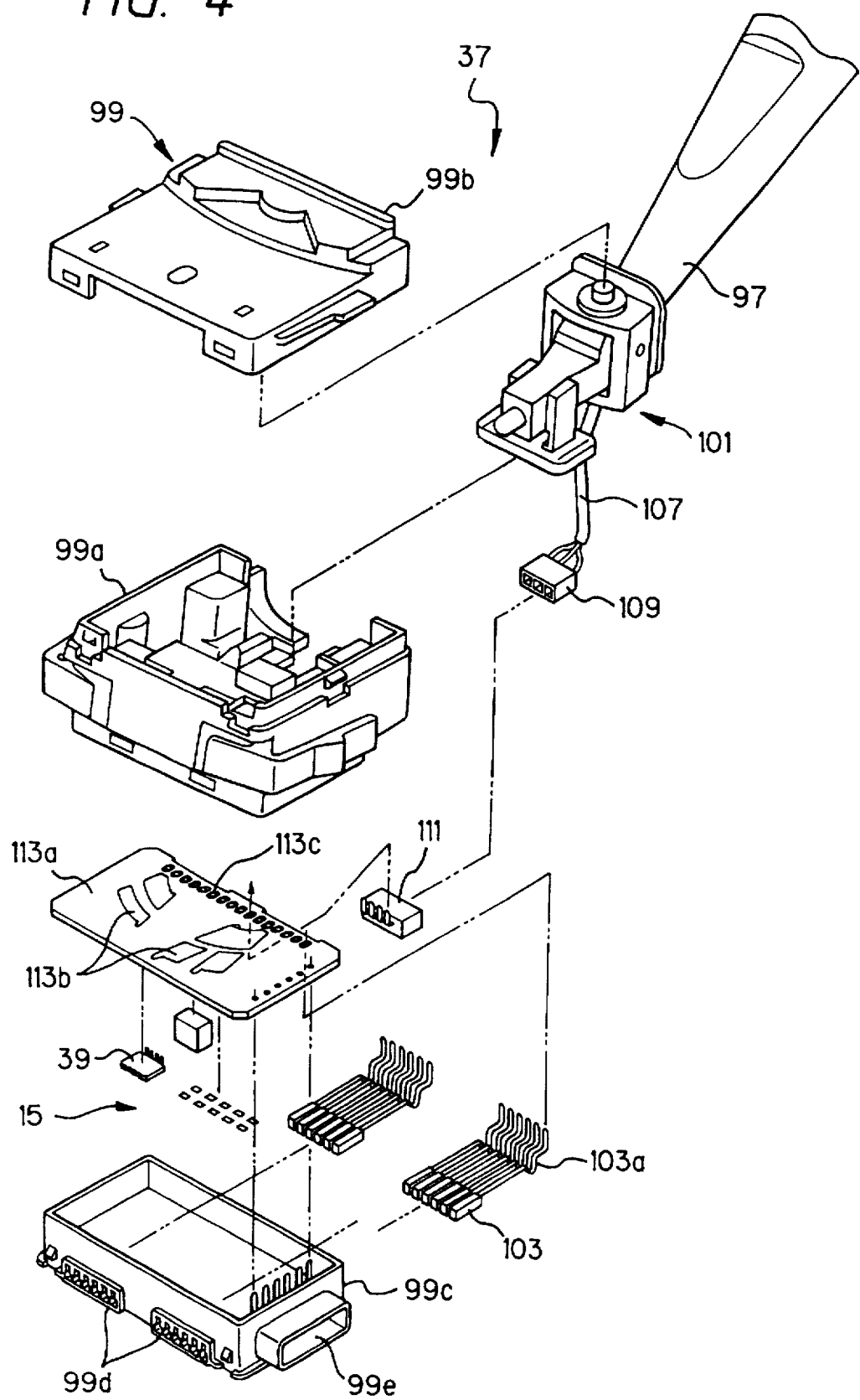
FIG. 4 is an exploded perspective view of a second switch assembly portion shown in FIG. 3.

Inside the operation lever 97 is a second knob switch portion 105 that is of a pushbutton type, a rotary type, or the like. When the operator operates the second knob switch portion 105, the connections are switched, and a signal based on the connection selected by the second knob switch portion 105 is transmitted to a connector 111 on the side of the wiper switch assembly 99 via a lead 107 and a second knob switch connector 109, as shown in FIG. 4.

The wiper lever switch 37 will be described in more detail. As shown in FIG. 4, the wiper switch assembly 99 includes: a housing 99a, an upper cover 99b, a lower cover 99c; a contact board 113a; and second assembling-side connection terminals 103. The contact board 113a has fixed contact portions 113b, which open and close circuits with a not shown movable contact of the wiper lever switch mechanism 101 which slides over the contact portions 113b. The contact board 113a also has terminal portions (through-hole terminals or the like) 113c that are electrically connected to the fixed contact portions 113b. Connection bars 103a and the second switch assembly side connector 111 are directly connected to the terminal portions 113c. The connection bars 103a are formed continuously from the second assembling-side connection terminals 103.

The contact board 113a has electronic components 15 mounted on the back of the fixed contact portions 113b. The electronic components 15 constitute a communication circuit including the control unit 39.

Figure 6:
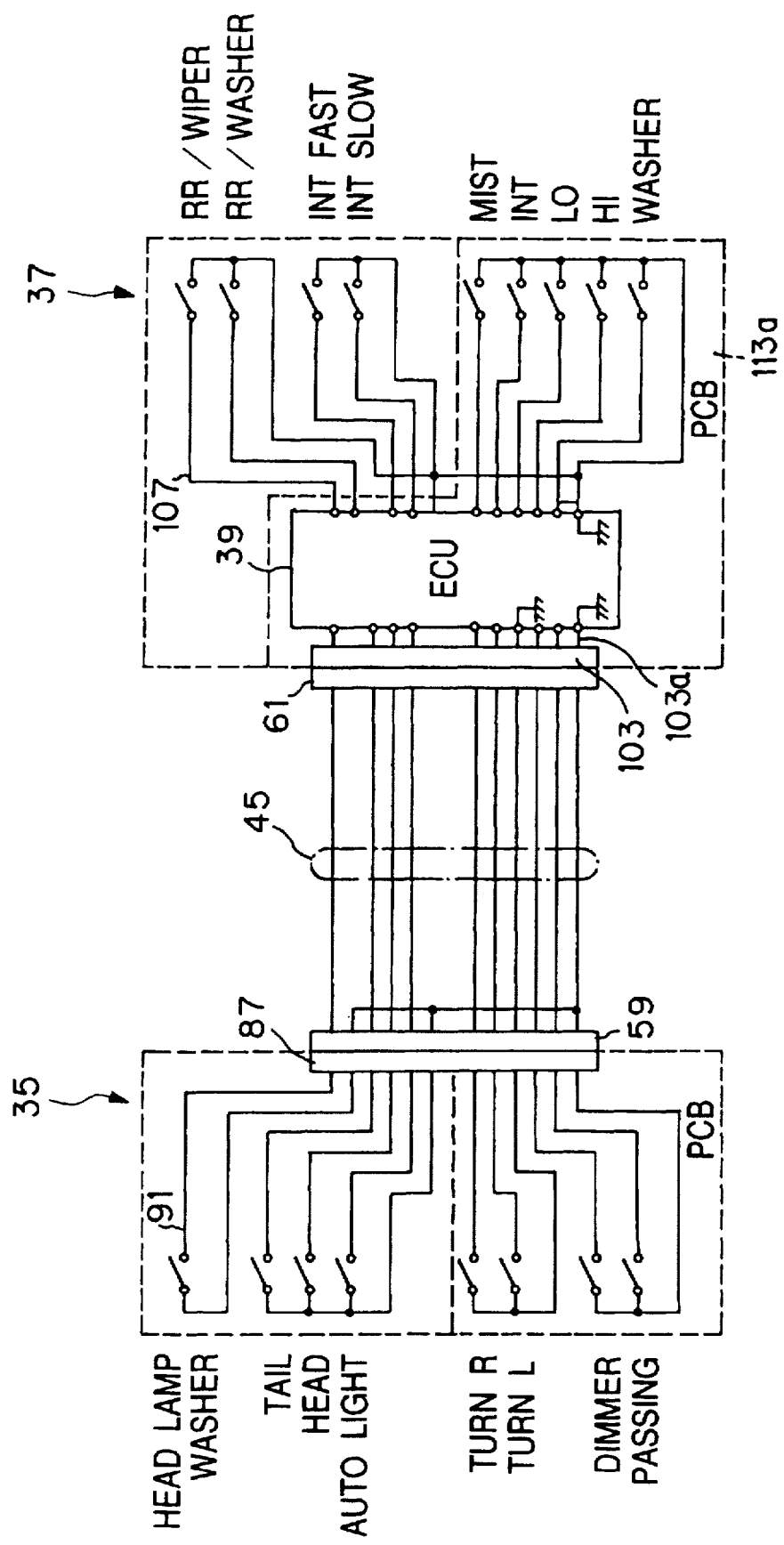
FIG. 6 is a wiring circuit diagram of the combination switch device in FIG. 1.
Figure 7:
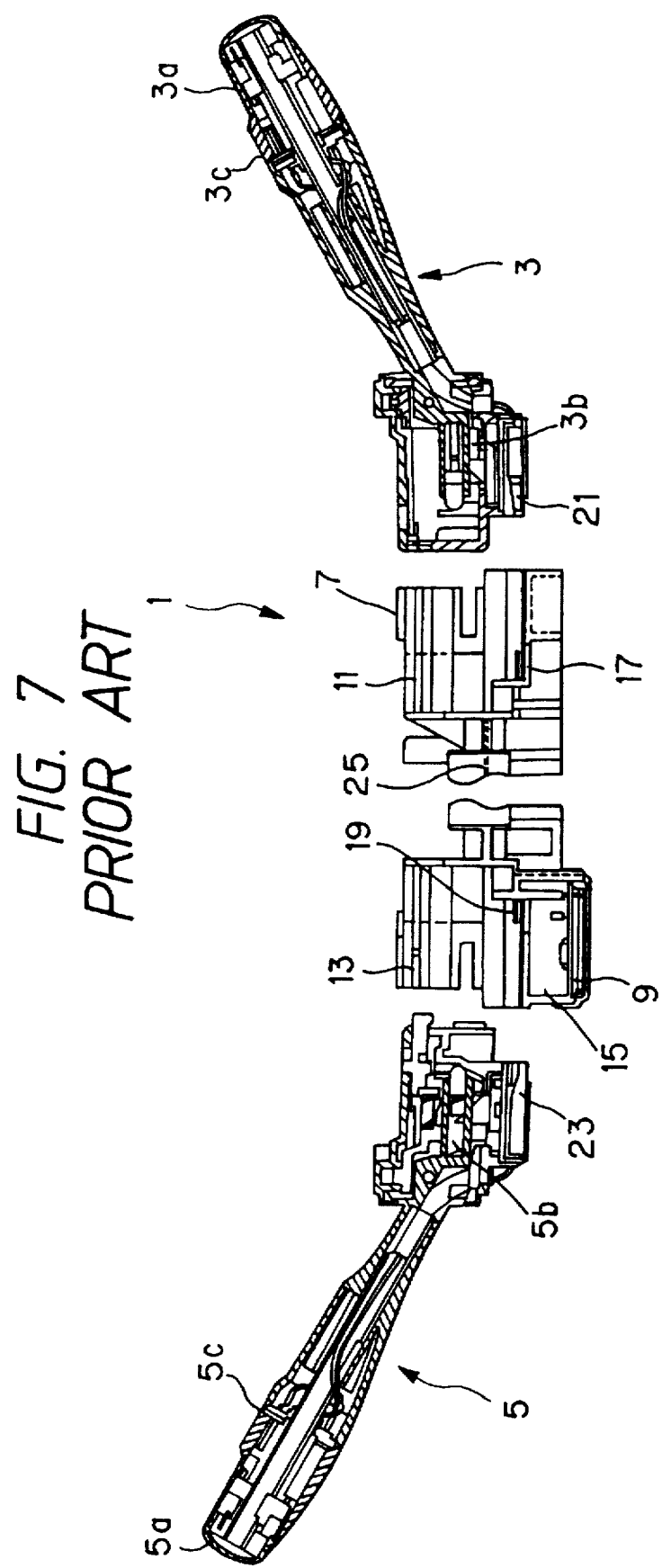
FIG. 7 is an exploded top view in section of a conventional combination switch device.
Figure 8:
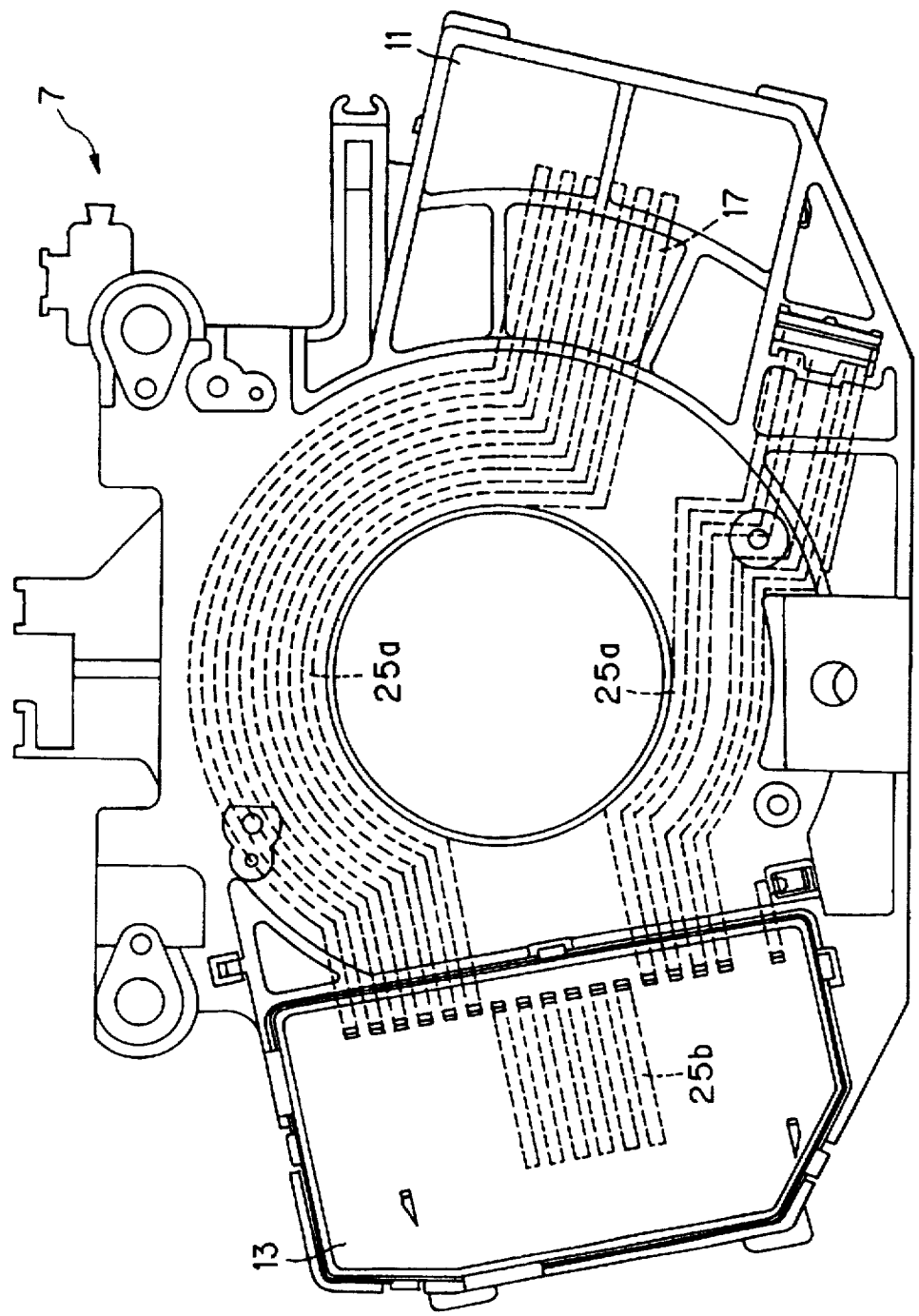
FIG. 8 is a front view of a body shown in FIG. 7.
Figure 9:
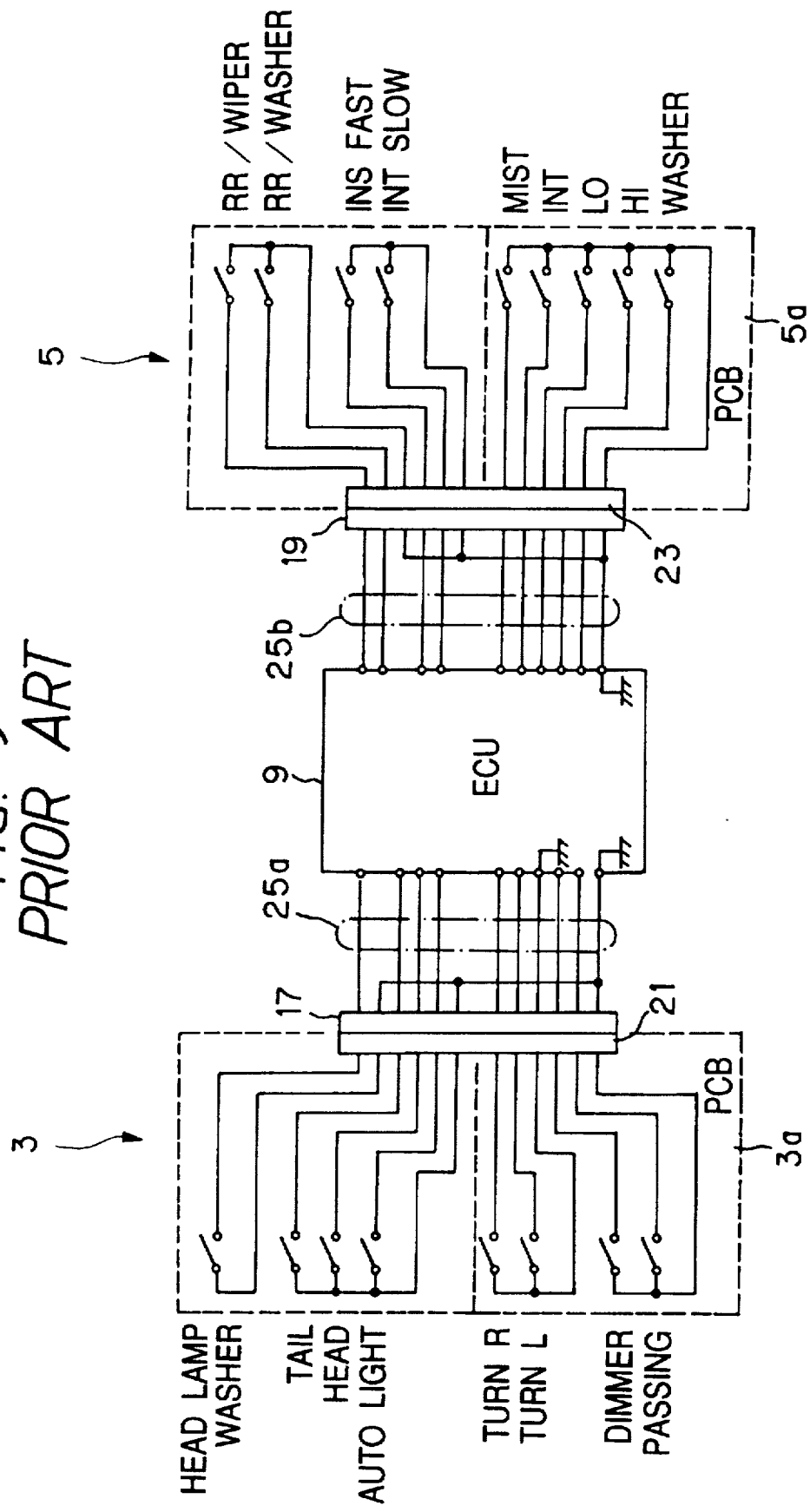
FIG. 9 is a wiring circuit diagram of the combination switch device shown in FIG. 7.

The control unit 39 is electrically connected to the second assembling-side connection terminals 103 through the terminal portions 113c and the connection bars 103a. That is, the wiper lever switch 37 is characterized as incorporating the control unit 39 therein, and as having the control unit 39 and the second assembling-side connection terminals 103 connected to each other directly on the contact board 113a as shown in FIG. 6. Therefore, in this wiper lever switch 37, the bus bars 25b (see FIG. 8) that connect the control unit 9 to the receiving-side connection terminals 19 arranged within the body are dispensed with, the bus bars 25b being indicated in the conventional structure shown in FIG. 9.

The lower cover 99c not only allows the electronic components 15 mounted on the contact board 113a and the assembling-side connection terminals 103 to be contained therein, but also has terminal engagement ports 99d opened in the front thereof and has a connector 99e for external connection arranged on a side surface thereof. It may be noted that the terminal engagement ports 99d accommodate the second receiving-side connection terminals 61 therein and that the connector 99e for external connection not only is connected to the contact terminal 113a but also has not shown external wires connected thereto so that multiplex signals can be sent to external units. Further, the second switch assembly side connector 111 to which the second knob switch connector 109 of the operation lever 97 is also contained in the lower cover 99c. While the case of the wiper lever switch 37 has been described as an example with reference to FIGS. 3 and 4, the turn lever switch 35 is constructed in a manner similar to the wiper lever switch 37 except that the turn lever switch 35 does not incorporate the control unit 39 therein.

Figure 5:
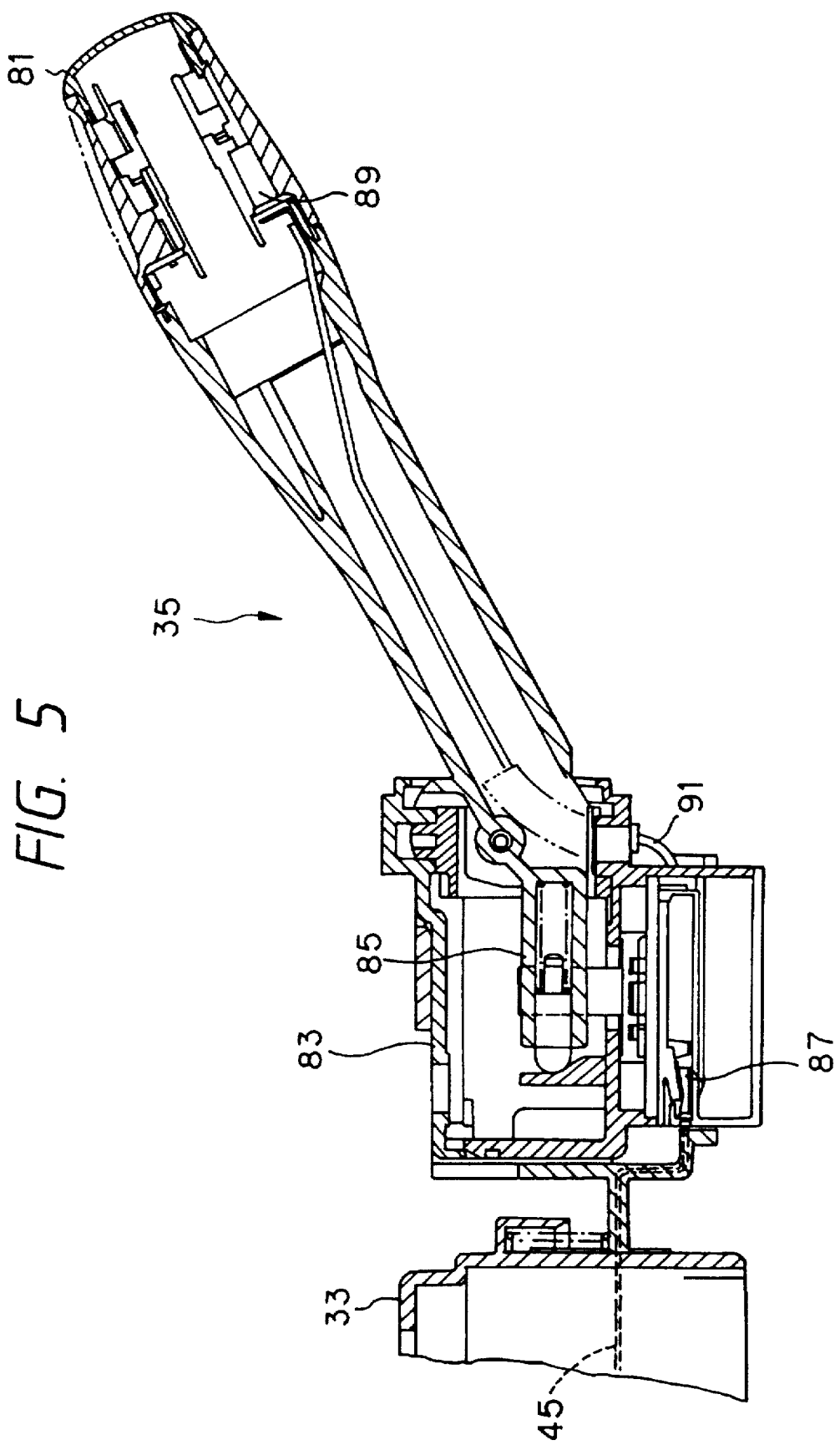
FIG. 5 is an enlarged top view in section with a turn lever switch shown in FIG. 1 attached.

That is, as shown in FIG. 1, the turn lever switch 35 is separated from the body 33 (into a unit) for maintenance considerations. Further, as shown also in FIG. 5, the turn lever switch 35 includes a substantially conical operation lever 81 and a turn switch assembly 83. A turn lever switch mechanism 85 is arranged within the turn switch assembly 83.

Further, the turn lever switch mechanism 85 has first assembling-side connection terminals 87 to be connected to the first receiving-side connection terminals 59 of the body 33 (see FIGS. 1 and 2).

A portion close to the base end of the operation lever 81 is journaled within the turn switch assembly 83. When an operator moves the operation lever 81 vertically or horizontally with this journal as a pivot, the base end of the operation lever 81 turns within the turn switch assembly 83, and such turning motions act on the turn lever switch mechanism 85 to thereby switch connections. The connection selected by the turn lever switch mechanism 85 is transmitted to the bus bars 45 via the first receiving-side connection terminals 59 of the body 33 by assembling the turn lever switch 35 to the body 33, as will be described later.

Inside the operation lever 81 is a first knob switch portion 89 that is of a pushbutton type, a rotary type, or the like. When the operator operates the first knob switch portion 89, the connections are switched, and a signal based on the connection selected by the first knob switch portion 89 is transmitted to the control unit 39 (see FIG. 1) of the wiper lever switch 37 via the first receiving-side connection terminals 59 of the turn switch assembly containing portion 51, the bus bars 45, and the second receiving-side connection terminals 61 of the wiper switch assembly containing portion 53.

A procedure for assembling the thus constructed combination switch device 31 will hereunder be described.

The turn lever switch 35 is inserted so as to slide into the turn switch assembly containing portion 51 of the body 33, the body 33 having the bus bars 45 insert-molded, and the wiper lever switch 37 is inserted so as to slide into the wiper switch assembly containing portion 53 (see FIG. 1). When both switches 35 and 37 are thereafter assembled to the corresponding containing portions by screwing, the first and second receiving-side connection terminals 59 and 61 of the bus bars 45 and the first and second assembling-side connection terminals 87 and 103 of the lever switches 35 and 37 (see FIGS. 3 and 5) are connected, so that the turn lever switch 35 (that performs turning, passing, dimmer switching, and the like), and the wiper lever switch 37 (that performs wiper operation, washer operation, misting, and the like) are electrically connected to the bus bars 45. That is, when the turn lever switch 35 and the wiper lever switch 37 are inserted so as to slide into the body 33 from both right and left sides of the body 33, these switches 35 and 37 are mechanically fixed to the body 33 and, at the same time, electrically connected to the control unit 39 under this condition. As a result, not only a significant improvement in operability, but also a reduction in the cost of manufacture by curtailing the number of bus bars can be implemented. It may be noted that the respective lever switches 35 and 37 are pre-assembled; e.g., the wire lever switch 37 is pre-assembled with the second knob switch connector 109 of the second knob switch portion 105 having been inserted into the second switch assembly side connector 111.

The combination switch device 31 is completed when the cancel cam 41 is put over the combination switch device 31 after the turn lever switch 35 and the wiper lever switch 37 have been assembled in the aforementioned way. It may be noted that a cancel cam 41 that has been assembled to the body 33 in advance can also be used.

According to the thus constructed combination switch device 31, when the respective lever switches 35 and 37 are attached to the body 33, the first and second assembling-side connection terminals 87 and 103 electrically contact the bus bars 45 simultaneously, and the turn lever switch 35 gets connected also to the control unit 39 incorporated in the wiper lever switch 37. Therefore, mechanical assembly of the turn lever switch 35 and the wiper lever switch 37 to the body 33 and electrical connection of the turn lever switch 35 and the wiper lever switch 37 to the control unit 39 can be implemented simultaneously. As a result, not only the assembling performance can be improved, but also the cost of manufacture can be reduced by dispensing with the bus bars that connect the control unit to the receiving-side connection terminals in the conventional device.

While the control unit is incorporated in the wiper lever switch in the aforementioned embodiment, the control unit may be of such structure as to be incorporated in the turn lever switch.

Further, while the control unit and the turn lever switch are connected to intercommunicate signals therebetween through a predetermined number of bus bars in the aforementioned embodiment, a further curtailment in the number of the bus bars can be implemented if a multiplex communication system such as one based on voltage division is applied between the control unit and the turn lever switch.

As described in the foregoing in detail, according to the combination switch device of the invention, not only the control unit to be connected to the bus bars are arranged in the lever switch, but also the lever switch portion and the knob switch portion of the lever switch are directly connected to the control unit within the lever switch. Therefore, when the lever switch is attached to the body, mechanical assembly of the lever switch to the body and electrical connection of the control unit to the bus bars can be implemented simultaneously. As a result, not only the assembling performance can be improved, but also the bus bars connecting the control unit to the receiving-side connection terminals in the conventional device can be dispensed with. Hence, not only the cost of manufacture can be reduced by curtailing the number of bus bars, but the body can be downsized as well.

What is claimed is:

1. A combination switch device comprising:

a body incorporating bus bars therein;

a plurality of lever switches incorporating assembling-side connection terminals and each lever switch having a structure that is releasably attached to said body and such that the assembling-side connection terminals electrically contact the bus bars at the time of attaching each of said plurality of lever switches to said body; and a control unit incorporated in one of said plurality of lever switches and connected to the assembling-side connection terminals, said control unit being connected to the bus bars at the time of attaching said one of said plurality of lever switches to said body, wherein said lever switches, other than said one of said plurality of lever switches, are electrically connected via the bus bars to said control unit.

2. The combination switch device according to claim 1, wherein said one of said plurality of said lever switches is a wiper lever switch.

3. The combination switch device according to claim 2, wherein a second of said plurality of lever switches is a turn lever switch.

* * * * *